United States Patent Office 3,370,167
Patented Feb. 20, 1968

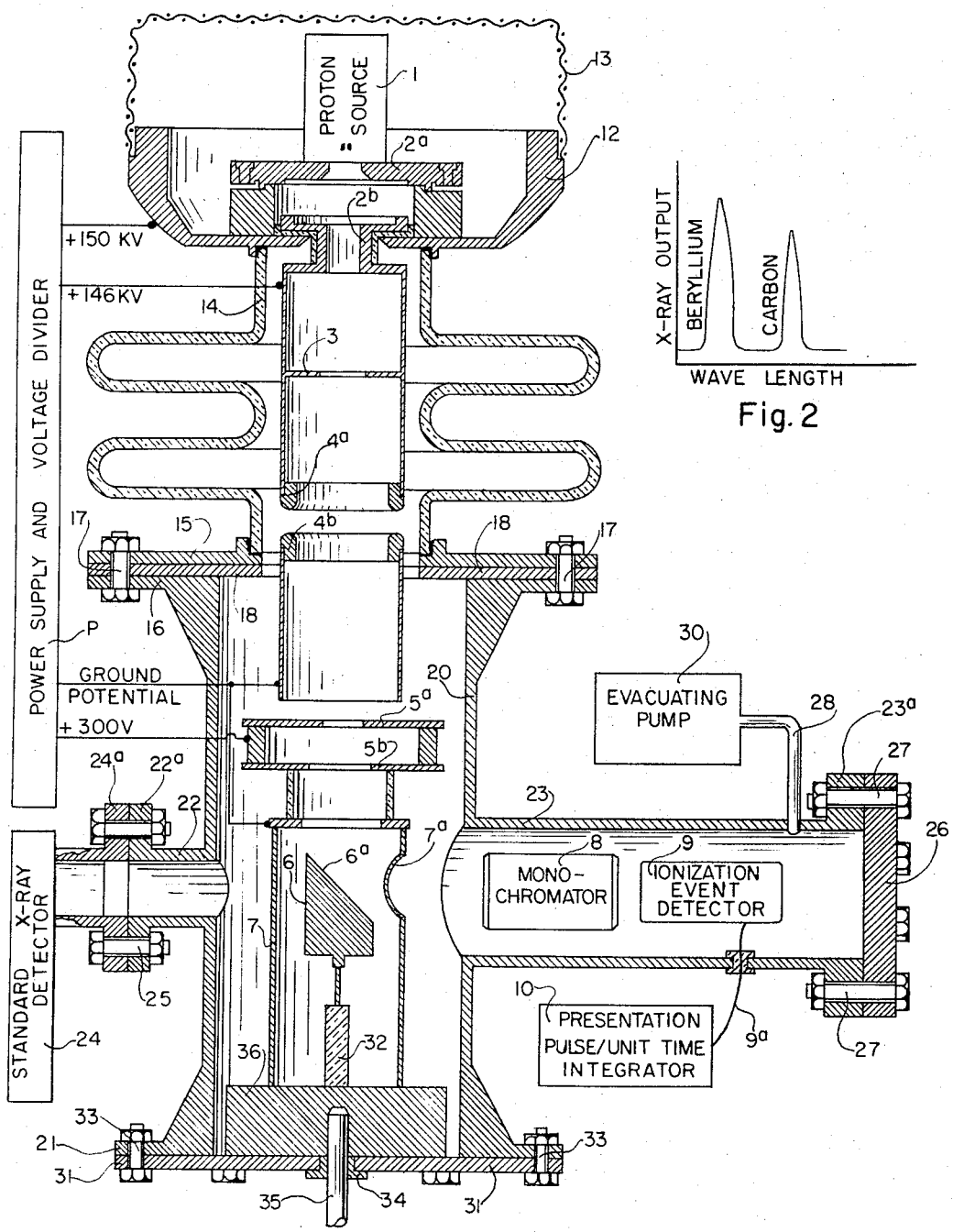

3,370,167
PROTON-EXCITED SOFT X-RAY ANALYZER HAVING A ROTATABLE TARGET FOR SELECTIVELY DIRECTING THE X-RAYS TO DIFFERENT DETECTORS
Andrew A. Sterk, Arlington, Va., assignor to American Machine & Foundry Company, a corporation of New Jersey
Filed July 13, 1964, Ser. No. 382,165
6 Claims. (Cl. 250—49.5)

This invention relates to X-ray spectroscopy including methods and apparatus for investigating and analyzing the chemical composition of various samples, and more particularly relates to methods and apparatus for analyzing samples containing low-atomic-number elements, especially elements below element number 12 (magnesium).

It is a well-known technique to spectrum-analyze samples in order to detect the presence of higher atomic-number elements, and to make quantitative determinations of their proportional content by using electrons to bombard the sample and then analyzing the resulting hard-X-ray spectrum to determine the wavelengths at which peaks occur in the spectrum and to determine the relative amplitudes of such peaks.

However, this technique does not provide useful and satisfactory results when applied to samples including low-atomic-number elements, because the bombarding of the latter with electrons produces virtually no X-ray output which can be detected and analyzed in the presence of the ambient hard-X-ray noise level which is distributed all through the output spectrum.

On the other hand, by bombarding a sample containing low-atomic-number elements using protons, instead of electrons, soft X-rays in relatively high concentration are emitted by those elements and it is therefore easy to utilize these soft X-rays to advantage in analyzing those low-atomic-number elements. For purposes of this disclosure, soft X-rays may be distinguished from ordinary hard X-rays by defining them as photon radiation at relatively long wavelengths in the region of 1–10 angstrom units, and including even greater wavelengths in the region of 10–1000 A., sometimes known as the ultra-soft region. Since X-ray penetrating power is an inverse function of wavelength, soft X-rays have much less penetrating power than hard X-rays, and are easily attenuated by atmospheric gases, so that soft X-rays must be utilized in an evacuated chamber.

When electrons bombard a low-atomic-number element, there is very little generation of photons because the bombarding electrons are relatively ineffectual in dislodging ring electrons from the K-shell of low-number atoms. However, because protons are some 1800 times greater in mass than electrons, they are effective in dislodging K-shell electrons when accelerated against a target of low atomic number, and therefore proton-bombardment of low-atomic-number elements provides an attractive way of extending spectroscopy techniques to low-atomic-number elements.

Another favorable characteristic of soft X-ray techniques is that the soft X-ray spectrum generated is characterized by high energy concentration in monochromatic peaks with very low noise level in the spectrum between those peaks, as distinguished from the ordinary hard X-ray spectra in which the output energy is distributed continuously over the spectrum with a few very poorly defined peaks for elements approaching the lower atomic numbers. The present invention, by using soft X-ray techniques including low background noise level in the spectrum and well defined peaks, provides easily analyzed outputs of which hard X-ray techniques are incapable.

It is a principal object of this invention to provide a novel method and a novel combination of apparatus for use in analyzing samples of materials containing low-atomic-number elements, the apparatus operating with good efficiency with regard to generating soft X-rays and delivering those X-rays without undue attenuation to suitable spectrum analyzing means comprising part of the novel combination.

The improvement is especially valuable from the practical viewpoint because of the fact that the element carbon (atomic number 6) is found in so many samples especially in organic chemistry applications. Other elements of low atomic number which are of great practical importance include oxygen, nitrogen, beryllium, etc.

More specifically, it is the object of this invention to provide the novel combination of a source of protons, accelerating means, a target and/or holder, X-ray spectrum analyzer means located opposite said target and sensitive to the soft X-ray region, and further including the all-important closed evacuated chamber enclosing together the target and the X-ray receiving portions of the analyzer.

Other objects and advantages of the present invention will become apparent during the following discussion of the drawing, wherein:

FIG. 1 is a view showing a soft X-ray generator in combination with a vacuum chamber enclosing apparatus for analyzing the X-ray output, and also including standard X-ray detector means for measuring the absolute value of the X-ray radiation from the sample under bombardment; and FIG. 2 is a graphical illustration showing the type of output concentration which would be obtained from a sample target containing carbon and beryllium.

Referring now particularly to the drawing, the X-ray generator itself comprises a suitable plasma source 1, comprising for instance an R.F.-excited source which can be purchased on the open market, from Ortec. The protons generated in the source 1 pass through a first electrostatic lens 2a and 2b and pass through a beam collimator 3 into a second electrostatic lens 4a and 4b. The protons then pass downwardly through an electron collector 5a and 5b and impinge upon a target 6 having a 45° target sample supporting surface 6a. The target itself is surrounded by a grounded electron collector 7 which is useful in suppressing secondary electrons emitted by the target, but which may also be appropriately connected with external measuring instruments (not shown) and is useful in connection therewith in measuring beam current in a manner well-known per se. The collector 7 has an aperture 7a looking to the right in the direction of a monochromator 8 of conventional type which passes a selected wavelength of X-rays to an ionization event detector 9 which is connected to a presentation unit 10 of suitable design, comprising for instance a pulse-per-unit-time integrator.

The acceleration of the protons from the plasma source toward the target is accomplished by voltages applied to the various electrodes from a power supply which is schematically represented by the box labeled P which includes suitable high voltage sources, filtering, and a suitable voltage divider chain supplying voltages at the various levels indicated in the drawing by way of example. The X-ray detector is within an evacuated envelope including an upper metallic housing 2 covered by a metal cage 13 which covers the plasma generator 1 and serves as a corona shield. The lower end of the member 12 is sealed to a glass insulator 14, the bottom end of which is sealed to a ring 15 which is coupled with a flange 16 by suitable bolts 17, a gasket 18 being interposed between the members 15 and 16. The flange 16 connects with a cylindrical portion 20 which extends downwardly and joins another flange 21 at its lower end. The cylindrical portion 20 has other housing members including a duct 22 extending leftwardly therefrom and located opposite a rightwardly extending chamber 23. The duct 22 terminates in a bolting flange 22a by which it can be either closed or else attached to another instrument. In the present example such instrument comprises a standard X-ray detector 24 mounted by a flange 24a and bolts 25, the instrument serving to quantitatively measure the amount of X-ray generated by the target to establish the general reference level of its intensity.

The chamber 23 terminates in a bolting flange 23a, and in the present illustration is closed by a plate 26 secured to the flange 23a by bolts 27. The chamber 23a has a duct 28 connected with a suitable evacuating pump 30. It is to be understood that the drawing is merely schematic with respect to the evacuating pump 30 and the duct 28 which, in order to operate efficiently, should be very much larger than the diameter illustration in the drawing.

The bolting flange 21 at the lower end of the cylindrical portion 20 of the envelope is attached to a plate 31 which supports the electron collector shield 7 and also an insulating support 32 which supports the target 6. The plate 31 has a bushing 34 through its center for receiving a shaft 35 which is in turn secured to a block 36 upon which the bottom of the electron collector 7 rests. The shaft 35 comprises a target rotating means which is illustrated as extending through the bushing 34 to a point outside of the envelope so that it can be selectively rotated for the purpose of swiveling the opening 7a and the target surface 6a so that they aim either out through the duct 22 toward the standard X-ray detector 24, or alternatively by rotation of the shaft 35 the target and collector 7 can be reversed to aim into the chamber 23 and into the monochromator 8.

Unlike an ordinary hard-X-ray generator and radiation analyzer, the present system employing soft X-rays must be entirely contained within an evacuated envelope because of the fact that soft X-rays are severely attenuated even when travelling relatively short distances through atmospheric gases. Therefore, the monochromator 8 and the ionization event detector 9 must be contained within the evacuated envelope, and this requirement also applies to the standard X-ray detector 24.

The embodiment shown in the present drawing is intended merely to illustrate one possible combination of units capable of analyzing the chemical content of targets including elements which are low on the atomic number table, and it is to be understood that various other known spectrum analyzing instruments could be substituted within the combination.

During operation of the illustrative embodiment to analyze a sample target, the protons are accelerated against the target which in the initial stage of the measurement is rotated 180° about the shaft 35 from the position shown in FIG. 1 so that the target surface 6a and the aperture 7a face leftwardly through the duct 22. With all operating potentials and conditions operating normally, the standard X-ray detector 24 is then employed to make a quantitative determination of the intensity of the soft X-rays given off from the target surface 6a. This is a calibration step intended to determine the total X-ray intensity from the target, and where there is no monochromator between the target and the standard detector 24, the target must be a pure element for the absolute calibration to be meaningful. When the absolute intensity of X-ray production has been calibrated for an element, a target containing that element on its surface 6a can be placed at the aperture 7a opposite the chamber 23 so that the soft-X-rays from the target surface 6a are directed into the monochromator 8, which effectively filters the soft X-ray radiation to remove all radiation from the sample except radiation occurring at the radiation wevelength of the element, for instance 44 angstroms for the element carbon, or other selected wavelengths including aluminum at 8.3 A, copper at 1.5 A, etc.

Suitable monochromators are well-known in the prior art, perhaps the two best-known devices including, for example, diffraction gratings located opposite fixed slits and serving to divide the impinging photon radiation into different wavelengths emerging at different angles which can then be selected by positioning of the slit. Another suitable type of monochromator includes a crystal which has atomic planes which cause diffraction of different wavelengths at different selectible angles. However, it is not intended to limit the present invention to either of these well-known monochromators, it being only necessary to provide a suitable means which will filter the composite X-ray output so that one wavelength at a time may be selected and its intensity determined. There are also other types of known analyzers which simultaneously display plural peaks in the spectrum.

In the present illustration, the selected monochromatic radiation component passes from the monochromator 8 into a suitable X-ray detector, such as an ionization event detector. Here again, the nature of the particular detector is not important in view of the fact that initial calibration of the particular combination of instructions employed will take care of differences in sensitivity and attenuation. This initial calibration can be conducted by using substantially pure target samples having known output characteristics.

Returning to the present example, the ionization event detector 9 will deliver pulses to the wire 9a which passes outwardly through the evacuated chamber 23 to the presentation device 10. As an example, a working device might include an integrator of pulses-per-unit-time, the integrated value being proportional to the X-ray intensity at the wavelength selected by the monochromator 8. Access to the monochromator 8 and the ionization event detector 9 can be had by removing the plate 31 and withdrawing the electron collector 7 including the target holder 6. Appropriate motor driven means may also be employed which would permit remote changing of target samples without breaking the vacuum.

It is also important to note that the evacuating pump 30 must be an oil-less type since the presence of oil in the pump contaminates the target material. There are some excellent pumps available at the present time which require no lubrication, and such a pump would be desirable in the present application. The pump is preferably connected with the main body of the envelope by a large-diameter duct which encourages the unobstructed passage of gas molecules toward the pump so that they may be removed.

The present invention is not to be limited to the exact form shown in the drawing, for obviously changes may be made therein within the scope of the following claims.

I claim:
1. Apparatus for analyzing the chemical composition of a sample of material containing a low-atomic-number element, comprising:
   (a) a vacuum chamber;
   (b) a source of protons in said chamber;
   (c) a target having a holder for said sample within said chamber;
   (d) means in the chamber for accelerating the protons to impinge upon the target sample;
   (e) a monochromator located in said chamber and positioned to receive X-rays emitted by the target sample;
   (f) and X-ray detector means located in said chamber and positioned to receive and measure monochromatic X-rays passing through the monochromator;
   (g) standard X-ray detector means disposed in said chamber adjacent the target;
   (h) target support means disposed in said chamber and having means extending outside said chamber for rotating said target; and (i) said rotating means selectively directing X-rays to said standard detector means and to said monochromator.

2. Apparatus as set forth in claim 1, further comprising means disposed in said chamber for suppressing secondary electrons emitted from said target while permitting X-rays to pass to said standard detector means and monochromator.

3. In apparatus as set forth in claim 1, the chamber having a first hollow portion enclosing the source, the accelerating means and the target sample; and the chamber having other portions including housing members extending transversely outwardly from the first portion opposite the target source, one of said other portions including the monochromator and the detector means and another of said other portions including said standard X-ray detector.

4. Apparatus for analyzing the chemical composition of a sample of material containing a low-atomic-number element, comprising:

(a) a source of protons;
(b) a target including a holder for a target sample;
(c) means for accelerating said protons against said target sample;
(d) X-ray-spectrum analyzing means positioned adjacent said target to receive and analyze X-rays emitted therefrom;
(e) a chamber surrounding and enclosing the source, the target sample, the accelerating means and the analyzing means;
(f) means for evacuating said chamber;
(g) standard X-ray detector means disposed in said chamber adjacent the target;

target support means disposed in said chamber and having means extending outside said chamber for rotating said target; and said rotating means selectively directing X-rays to said standard detector means and to said analyzing means.

5. Apparatus as set forth in claim 4, further comprising means disposed in said chamber for suppressing secondary electrons emitted from said target while permitting X-rays to pass to said standard detector and analyzing means.

6. In apparatus as set forth in claim 4, the chamber having a first hollow portion enclosing the source, the accelerating means and the target sample; and the chamber having other portions including housing members extending transversely outwardly from the first portion opposite the target source, one of said other portions including the analyzing means and another of said other portions including said standard X-ray detector.

References Cited

UNITED STATES PATENTS

| | | | |
|---|---|---|---|
| 2,924,715 | 2/1960 | Hendee et al. | 250—51.5 |
| 3,204,095 | 8/1965 | Watanabe | 250—49.5 |

OTHER REFERENCES

"Characteristic K-Shell X-Ray Production in Magnesium, Aluminum and Copper by 60- to 50-KeV Protons," J. M. Khan et al., Physical Review 133, pp. A890–A894, February 1964.

"K-Shell Ionization by Protons," S. Messelt, Nuclear Physics, vol. 5, pp. 435–438, January 1958.

RALPH G. NILSON, *Primary Examiner.*

WALTER STOLWEIN, *Examiner*

A. L. BIRCH, *Assistant Examiner.*